(12) United States Patent
Bruns et al.

(10) Patent No.: US 10,246,130 B2
(45) Date of Patent: Apr. 2, 2019

(54) TRACKLESS TUGGER TRAIN AND METHOD FOR STEERING A TRACKLESS TUGGER TRAIN

(71) Applicants: Helmut-Schmidt-Universität, Hamburg (DE); Hamburg Innovation GmbH, Hamburg (DE)

(72) Inventors: Rainer Bruns, Hamburg (DE); Stephan Ulrich, Hamburg (DE); Konstantin Krivenkov, Hamburg (DE)

(73) Assignees: Helmut-Schmidt-Universität / Universität der Bundeswehr Hamburg, Hamburg (DE); Hamburg Innovation GmbH, Hamburg (DE)

( * ) Notice: Subject to any disclaimer, the term of this patent is extended or adjusted under 35 U.S.C. 154(b) by 643 days.

(21) Appl. No.: 14/713,302

(22) Filed: May 15, 2015

(65) Prior Publication Data

US 2015/0367885 A1 Dec. 24, 2015
US 2017/0197657 A9 Jul. 13, 2017

(30) Foreign Application Priority Data

May 16, 2014 (DE) .......................... 10 2014 106 928
Oct. 13, 2014 (DE) .................... 20 2104 104 858 U

(51) Int. Cl.
*B62D 13/02* (2006.01)
*B62D 13/00* (2006.01)
*B62D 53/00* (2006.01)
*B62D 5/04* (2006.01)
*B62D 12/02* (2006.01)
*B62D 63/08* (2006.01)
*F16H 1/28* (2006.01)

(52) U.S. Cl.
CPC ........... *B62D 13/02* (2013.01); *B62D 5/0421* (2013.01); *B62D 12/02* (2013.01); *B62D 13/00* (2013.01); *B62D 13/005* (2013.01); *B62D 53/00* (2013.01); *B62D 53/005* (2013.01); *B62D 63/08* (2013.01); *F16H 1/2854* (2013.01)

(58) Field of Classification Search
CPC ...... B62D 13/02; B62D 5/0421; B62D 12/02; B62D 13/00; B62D 53/00; B62D 53/005; B62D 63/08; F16H 1/2854
See application file for complete search history.

(56) References Cited

U.S. PATENT DOCUMENTS 4,127,202 A * 11/1978 Jennings ................ B60D 1/173
280/408
4,235,451 A * 11/1980 Leriverend ............. B61D 3/10
105/4.1
5,700,023 A * 12/1997 Picard .................. B62D 53/005
280/411.1

(Continued)

*Primary Examiner* — Jacob D Knutson
(74) *Attorney, Agent, or Firm* — Kelly & Kelley, LLP

(57) ABSTRACT

The subject matter of the invention is a trackless tugger train having at least one transportation module and at least two axle modules. Each transportation module is arranged between two axle modules, wherein each axle module has a wheel axle and a steering device for steering the wheel axle, wherein the steering devices of the axle module are embodied in each case in such a way that each steering device steers the axle module which is assigned to it, independently of a steering device of another axle module.

15 Claims, 11 Drawing Sheets

(56) References Cited

U.S. PATENT DOCUMENTS

| | | | | |
|---|---|---|---|---|
| 5,860,667 A | * | 1/1999 | Andre | B60D 1/075 |
| | | | | 280/408 |
| 2010/0282122 A1 | * | 11/2010 | Mai | B60L 7/10 |
| | | | | 105/1.4 |
| 2015/0001830 A1 | * | 1/2015 | Badura | B62D 53/00 |
| | | | | 280/408 |
| 2015/0251583 A1 | * | 9/2015 | Ziemann | B62D 53/005 |
| | | | | 414/495 |

* cited by examiner

TRACKLESS TUGGER TRAIN AND METHOD FOR STEERING A TRACKLESS TUGGER TRAIN

FIELD OF INVENTION

The present invention relates to a trackless tugger train. In addition, the invention relates to a method for steering a trackless tugger train.

BACKGROUND OF THE INVENTION

Trackless tugger trains can be used, in particular, as industrial trucks for transportation within a company's premises, for example. A tugger train usually has at least one transportation module, preferably two or more transportation modules which are arranged one behind the other and which can be embodied in such a way that they can transport loads or goods, in particular horizontally. In addition, the tugger train generally has a towing vehicle which is harnessed in front of the first transportation module when viewed in the direction of travel, in order to tow the transportation modules and therefore move in a desired direction. An important objective when configuring a tugger train is that the transportation modules follow the towing vehicle with the greatest possible directional stability. Small directional deviations of the transportation modules, or even none at all if possible, permit narrow travel lanes of the tugger train, with the result that the tugger train can be moved safely even on small traffic areas. Furthermore, the directional stability reduces the risk of collision accidents, since transportation modules which do not move in the track of the towing vehicle can quickly collide in bends with persons or objects located at the edge of the travel lane.

Various configurations of the running gear units of the transportation modules are known from the prior art. For example, the transportation modules can have two main wheels which are arranged on a wheel axle in a non-pivotable fashion. In addition to the main wheels, further support rollers, which are embodied as trailing rollers, can preferably be arranged at the corners of the transportation module in order to safely support the transportation module. These support rollers can orient themselves automatically and therefore usually do not influence the trailing behaviour and the directional stability significantly. The running gear unit of these two-wheel or single axle transportation modules is of simple design and can therefore be manufactured cost-effectively. Since no device is required to steer the wheels, the running gear unit has a low level of complexity, as a result of which it requires little maintenance and is operationally reliable. The disadvantage of this running gear unit which is arranged directly on the transportation module is, however, that the axle with the two main wheels has to be located approximately in the centre of the transportation module in order to be able to achieve a good trailing behaviour and therefore a high level of conventional stability of the transportation module. However, this considerably restricts the possibilities in terms of loading the transportation modules with rollable transportation frames. In particular, unless additional technical aids are used, transportation modules with such running gear units cannot be loaded on both sides with relatively large transportation frames whose footprints dimensions correspond approximately to the width of the transportation modules.

In order to be able to permit the transportation modules to be loaded and unloaded on both sides with transportation frames or other rollable cargo carriers, four-wheeled transportation module running gear units have been developed for a tugger train in which in each case two wheels are arranged on one axle. These wheels are mounted in such a way that they can be pivoted about a vertical axis using a mechanical or hydraulic steering device. A trackless tugger train with such a running gear unit is known, for example, from DE 10 2008 060 801 B3. Steering angles of the wheels are changed here by the steering device as a function of the angle between the trailer drawbar and the trailer longitudinal axis. The individual steering devices are coupled to one another here, for example, via a linkage, with the result that the steering angles of the front wheels correspond in value to the steering angles of the rear wheels. It is disadvantageous here that the steering movement of the front axle wheels has to be transmitted to the rear wheels by reversing the direction. This is difficult, in particular, when the transportation modules are to be loaded and unloaded on both sides with rollable transportation frames. For this purpose, an embodiment of the transportation modules is used which is referred to as a U-frame and whose supporting frame has, when viewed from the side, the shape of a gantry which is open at the bottom. The pillars of this gantry are supported here by the two wheel axles. The transmission of the steering lock from the front axle to the rear axle is particularly costly here, since the movement has to be transferred over relatively large distances and experiences a plurality of directional deflections. The technical expenditure on implementation for such a tugger train is therefore very high, as a result of which both the manufacturing costs and the maintenance requirements are high.

SUMMARY OF THE INVENTION

The object of the present invention is therefore to make available a trackless tugger train which is distinguished by good loadability, good trailing behaviour with low directional stability, and by ease of manufacture with a low level of technical complexity. In addition, an object of the present invention is to make available a method for steering a trackless tugger train, by means of which particularly good dimensional stability of the trackless tugger train can be achieved.

This object is achieved with the features of the independent claims. Advantageous developments of the invention are specified in the dependent claims.

According to the invention, a trackless tugger train is provided which has at least one transportation module and at least two axle modules, wherein each transportation module is arranged between two axle modules. Each axle module has a wheel axle and a steering device for steering the wheel axle. Each steering device of an axle module is embodied in each case in such a way that the steering device steers the axle module which is assigned to it, independently of a steering device of another axle module.

In the tugger train according to the invention, both the wheel axle and the steering device are arranged on the axle module and not on the transportation module. The tugger train is therefore constructed from an articulated-belt-like system of alternatingly arranged axle modules and transportation modules and is thus not constructed from transportation modules or trailers which are coupled to one another in an arrangement one behind the other. The tugger train can have a transportation module, preferably a plurality of transportation modules which are arranged one behind the other, wherein the transportation modules can have load-pick-up devices by means of which the transportation modules can pick up loads or goods to be transported. The axle modules support the weight of the transportation modules and of the loads or goods to be transported on the ground via the wheel axle to which preferably two wheels are attached. Each axle module has, in addition to the wheel axle, a steering device which orients the wheel axle in such a way that the directional deviations during the customary travel maneuvers are as small as possible or tend towards zero. The steering devices of the individual axle modules are not coupled or connected to one another but instead the steering device of each axle module operates independently of the steering devices of the other axles modules. The steering devices of the axle modules are therefore not operatively connected to one another in the tugger train according to the invention. As a result of the fact that the steering devices of the axle modules are not coupled to one another or are not operatively connected, there is also no connection provided, for example in the form of a linkage, between the individual steering devices or axle modules, which otherwise would have to be guided by means of the transportation modules and therefore can impede the loadability of the transportation modules. By contrast, the transportation modules of the tugger train according to the invention are not restricted in their loadability, with the result that the transportation modules can be loaded from both sides with rollable transportation frames without difficulty. In addition, the technical complexity during the manufacture of such a tugger train according to the invention is also reduced, since there is no need to form or produce a connection, which is costly in terms of construction and which is to be mounted, between the individual axle modules or the steering devices of the axle modules. As a result of the fact that according to the invention each steering device of an axle module operates or acts independently of other steering devices of other axle modules, it is also not necessary to transmit information and/or energy from the towing vehicle to the axle modules or from one axle module to another.

The axle modules have, in addition to the wheel axle and the steering device, in each case preferably a first cantilever arm and a second cantilever arm, wherein the first cantilever arm and the second cantilever arm are preferably connected, in particular indirectly or directly, to the wheel axle via an articulated connection. The two cantilever arms, which can also be embodied as supporting frames, serve as connecting means between the axle modules and the transportation modules or the towing vehicle. By means of the first cantilever arm, for example, a transportation module can be attached, with its rear side directed opposite to the direction of travel, to the axle module. In the case of the axle module which is arranged as the first one in the tugger train, the towing vehicle can be attached with its rear side by means of the first cantilever arm. By means of the second cantilever arm, for example a transportation module can be attached, with its front side directed in the direction of travel, to the axle module. The cantilever arms are preferably embodied from a rigid material. In an attached state of the transportation modules or of the towing vehicle to, in each case, a cantilever arm, the connection between the cantilever arms and the transportation modules or the towing vehicle is embodied in a rigid fashion, with the result that a movement between a cantilever arm and a transportation module or a towing vehicle is prevented. As result of this rigid connection, all the operating forces and torques which occur can be transmitted between the respective axle module and the respective transportation module. In order to be able to exchange the transportation modules and/or to be able to make the tugger train shorter or longer, the cantilever arms are preferably configured in such a way that the transportation modules or the towing vehicle can easily be released from the cantilever arms and also attached again. As a result, the tugger train can be adapted to changing operating conditions and requirements without a large amount of expenditure.

In order, in particular, to permit cornering of the tugger train, the first cantilever arm and the second cantilever arm are preferably connected to the wheel axle by means of an articulated connection. By means of this articulated connection, the first cantilever arm can be rotated relative to the second cantilever arm, and vice versa, with the result that the transportation modules which are attached to the cantilever arms can follow the cornering of the towing vehicle. The cantilever arms are connected to the respective wheel axle of an axle module via the articulated connection, with the result that a defined rotational movement between, in each case, a cantilever arm and the wheel axle can be made possible.

The articulated connection preferably has a least one vertical pivoting joint, wherein the vertical pivoting joint preferably has a rotational axis which is embodied vertically with respect to the longitudinal extent of the cantilever arms. The one vertical pivoting joint or the plurality of vertical pivoting joints, which are preferably embodied in the form of a shaft, permit a relative movement of the two cantilever arms of an axle module with respect one another. As a result of the rotational axis of the vertical pivoting joints, a lateral rotational movement of the two cantilever arms of an axle module vertically with respect to the longitudinal extent of the cantilever arms can be made possible, with the result that the tugger train can travel through bends. The vertical pivoting joint or vertical pivoting joints are preferably embodied in a rigid fashion with a high degree of strength so that the vertical pivoting joints can transmit tensile forces, the weight forces of the transportation modules and of the loads to be transported and tilting moments which can arise in the case of cornering as a result of the centrifugal forces and when the centre of gravity is off-centre.

The articulated connection can have, for example, precisely one vertical pivoting joint, wherein the first cantilever arm and the second cantilever arm are then preferably connected to the one vertical pivoting joint. If a single vertical pivoting joint to which both cantilever arms of an axle module are attached is provided, the steering movement of the wheel axle can be simplified, since the wheel axle can then be steered without moving the transportation modules which are connected to the corresponding axle module.

Alternatively it is, however, also possible for the two cantilever arms of an axle module not to be connected directly to the wheel axle via a common vertical pivoting joint, but instead for the articulated connection to have a first vertical pivoting joint and a second vertical pivoting joint, wherein the first cantilever arm is preferably connected to the wheel axle via the first vertical pivoting joint, and wherein the second cantilever arm is connected to the wheel axle via the second vertical pivoting joint. The two vertical pivoting joints can be arranged here, for example, on a plate which is fixedly connected to the wheel axle, and can be connected to the wheel axle and also to one another via this plate.

Furthermore, it is possible for the articulated connection to have a horizontal pivoting joint, wherein the horizontal pivoting joint preferably has a rotational axis which extends transversely with respect to the direction of travel of the trackless tugger train, in particular in the case of straight-ahead travel of the tugger train. The horizontal pivoting joint can be arranged in the first cantilever arm itself or between the first cantilever arm and the wheel axle or in the second cantilever arm itself or between the second cantilever arm and the wheel axle. The rotational axis of the horizontal pivoting joint can permit a downward and upward rotational movement of the cantilever arms about the horizontal pivoting joint, as result of which a travel motion of the tugger train for example over an uneven piece of ground such as, for example, travelling on a ramp with a gradient, can be compensated.

In order to be able to achieve an optimum steering movement of the transportation modules with very high directional stability, the steering device is preferably embodied in such a way that the steering device steers the wheel axle into an angle-bisecting position between the first cantilever arm and the second cantilever arm. Accordingly, there is preferably provision that a first, front steering angle between the first cantilever arm and the wheel axle and that a second, rear steering angle between the second cantilever arm and the wheel axle are adjusted to an essentially equally large position by the steering device. The steering device is therefore preferably embodied in such a way that it can correspondingly adjust or orient the wheel axle in such a way that the wheel axle can be placed, even during cornering, in a position in which the first, front steering angle is of the same size as the second, rear steering angle. The steering device can be composed of a mechanical, hydraulic, pneumatic, electromagnetic or electric-motor-powered system for steering the wheel axle.

For example, the steering device can have at least two connecting rods, preferably embodied in a rigid fashion, wherein a first connecting rod can be connected by a first end to the first cantilever arm and by a second end to the wheel axle, and wherein a second connecting rod can be connected by a first end to the second cantilever arm and by a second end to the wheel axle, wherein the connecting rods can each be guided in a displaceable fashion in a linear guide by their first end or their second end. As a result of the arrangement of these at least two connecting rods which are guided in a linear fashion on one side, a steering device with simple mechanical kinematics can be formed, in which the first, front steering angle and the second, rear steering angle are always of the same size and therefore the wheel axle is always oriented in the direction of the angle-bisector between the two cantilever arms. With such a steering device, the two steering angles are forcibly set as a function of the angle, also known as the bend angle, between the first cantilever arm in the second cantilever arm. Such a steering device is distinguished by a simple design, as a result of which the manufacturing costs and also the expenditure on maintenance are low. In addition, such a steering device is also distinguished by low susceptibility to faults. In order to be able to increase the rigidity of such a steering device, it may also be preferred for said steering device to have four connecting rods, wherein a third connecting rod is connected, like the first connecting rod, by a first end to the first cantilever arm and by a second end to the wheel axle, and wherein a fourth connecting rod is connected, like the second connecting rod, by a second end to the wheel axle, wherein the third and the fourth connecting rods can also each be guided in a displaceable fashion in a linear guide, by their first end or their second end.

A steering device with simple mechanical kinematics in which the first, front steering angle and the second, rear steering angle are always of the same size, and therefore the wheel axle is always oriented in the direction of the angle-bisector between the two cantilever arms, can also be embodied in such a way that the steering device is embodied in the form of a gear unit. The gear unit permits a 1:1 transmission ratio, by means of which the wheel axle can be brought into an angle-bisecting position between the first cantilever arm and the second cantilever arm. By means of the gear unit, a rotational movement of the first cantilever arm, for example in the clockwise direction, can be transformed into a rotational movement of the second cantilever arm in the anti-clockwise direction, and vice versa.

The gear unit can have a first gear wheel connected to the first cantilever arm, a second gear wheel connected to the second cantilever arm, and at least a third gear wheel connected to the wheel axle, wherein the first gear wheel and the second gear wheel can be connected in a rotationally movable fashion by means of the at least one third gear wheel. The gear wheels can be embodied here, for example, in the form of bevel gears which are arranged so as to engage one in the other.

In addition it is also possible for the steering device to be embodied in the form of a spring-damper system. By means of a spring-damper system, particularly good directional stability of the transportation modules can be obtained in the case of both steady-state and dynamic driving maneuvers. In addition, a spring-damper system is distinguished by a simple mechanical design.

The spring-damper system preferably has a first spring element connected to the first cantilever arm and the wheel axle, a second spring element connected to the second cantilever arm and the wheel axle, and at least one damper element. The spring elements can be embodied, in particular, as linear spring elements or as torsion or torsional springs. The spring elements are preferably embodied in such a way that they can produce a resulting torque which the wheel axle orients in the direction of the angle-bisector between the first cantilever arm and the second cantilever arm.

In order to be able to achieve a high level of directional stability even in the case of dynamic driving maneuvers, such as entering a bend or exiting a bend, at least one damper element is preferably provided in addition to the two spring elements. The damper element can be connected to the wheel axle and to the first cantilever arm or to the second cantilever arm. The damper element is preferably embodied in such a way that it can generate a force or a torque which depends on the value and the direction of the speed at which the length or the angle of the damper element can be changed. The force or the torque of the damper element always preferably acts counter to the direction of movement here. As a result, delayed steering of the wheel axle is made possible. In the case of dynamic driving maneuvers it is advantageous if the first, front steering angle rotates more quickly than the second, rear steering angle. This can be achieved in that the first cantilever arm rotates more quickly with respect to the wheel axle than the second cantilever arm with respect to the wheel axle, wherein the speed of the rotational movement of the second cantilever arm with respect to the wheel axle can be damped or reduced by means of the damper element.

There is preferably provision that the damper element is embodied in such a way that the effect of the damper element can be changed as a function of the velocity of the respective wheel axle, as a result of which the influence of the velocity on the directional stability can be reduced or even entirely eliminated. The velocity of a wheel axle, i.e. the speed of the centre of the wheel axle, can be determined from locally available movement variables, for example the rotational speed of the wheels of the wheel axle.

In order to be able to adapt the steering behaviour of the tugger train to the respective operating conditions, the damper element can also be embodied in an adjustable fashion. This permits a user to optimize the directional stability or the trailing behaviour of the transportation modules of the tugger train in the case of cornering by adjusting the damper element.

In the case of a spring-damper system there is particularly preferably provision that the spring-damper system has three damper elements which are each connected by a first end to the wheel axle and by a second end to an attachment frame connected to the articulated connection, wherein a first damper element and a second damper element are preferably arranged inclined at an angle of <90° with respect to the longitudinal extent of the wheel axle and are connected to a first side of the wheel axle, and wherein preferably a third damper element is arranged vertically, preferably at an angle of 90°, with respect to the longitudinal extent of the wheel axle, and is connected to a second side of the wheel axle lying opposite the first side. As a result of this embodiment of the spring-damper system, particularly good directional stability can be achieved during cornering.

Furthermore, it is possible for the steering device to have a motor-powered drive which can be controlled by means of an electronic control unit. With such a steering device, the wheel axle of an axle module can be steered using the motor-powered drive, wherein the motor-powered drive, also referred to as a motor-powered servo-drive, of each steering device of an axle module can be controlled by the electronic control unit as a function of the time profiles of the velocity and of the steering angle of the towing vehicle or as a function of the time profiles of the velocity and of the steering angle of the axle module travelling directly ahead thereof. The steering devices of the individual axle modules operate independently of one another, are, as it were, autonomous, and are therefore not connected to one another or not operatively connected to one another. The motor-powered drive of a steering device preferably has a motor for generating a mechanical actuating power and a gear unit for adapting actuation travel and an actuation torque or an actuation force. The motor-powered drive of the steering device can form a type of steering angle-correction device. Open-loop or closed-loop control of the motor-powered drive can be performed by the electronic control unit in such a way that the axle centre point of the axle module which is to be adjusted or steered follows as precisely as possible the trajectory of the axle centre point of the axle module arranged immediately ahead of the latter, when viewed in the direction of travel of the tugger train. For this purpose, the current position of the axle centre point of the axle module which is to be adjusted or steered and the trajectory of the axle centre point of the axle module which is arranged directly ahead of the latter when viewed in the direction of travel of the tugger train are determined. In order to determine the axle centre points or the coordinates of the axle centre points, state variables and/or movement variables such as the accelerations and/or the speeds at two different points on the wheel axle of the axle module, the rotational acceleration of the wheel axle about its vertical axis which extends perpendicularly with respect to the direction of travel of the tugger train, the rotational speeds of the two wheels of an axle module, the wheel loads or wheel contact forces and/or the angles between the wheel axle and the cantilever arm, arranged ahead of or behind the latter, of the axle module can be determined. These state variables and/or movement variables can be measured locally at the corresponding axle module, with the result that a data-transmitting connection between the individual axle modules via lines or by radio is not necessary. However, it is alternatively also possible that the determination of the state variables and/or movement variables of the axle module which is to be adjusted or steered can be carried out by communication with the axle module which is arranged directly ahead of the latter when viewed in the direction of travel of the tugger train. If the axle centre points of the respective axle modules are determined, the distance between the axle centre point of the axle module which is to be adjusted or steered and the axle centre point of the axle module which is arranged directly ahead of the latter when viewed in the direction of travel of the tugger train can be obtained. If the distance between the axle centre points is known, variables which are required for the steering control of the wheel axle of the axle module to be steered can be determined by means of this data and by means of suitable algorithms, with the result that the steering angle of the axle module which is to be adjusted or steered can be changed in such a way that the axle centre point of the axle module which is to be adjusted or steered is steered again to the trajectory which is provided. A mathematical model of movement dynamics of the entire tugger train can be stored in the electronic control unit and can be used to calculate the optimum steering angles of the individual wheel axles at any point in time. The steering angles which are obtained in the process can be set, for example, by means of a controlled electric-motor-powered steering drive. For this purpose, the actual steering angles are preferably measured continuously and the measured signals are fed back to the controller of the steering device. As a result of the fact that this process, and therefore the correction of the steering angle of an axle module, preferably takes place continuously, at short intervals, optimum directional stability or optimum trailing behaviour of the tugger train can be achieved by means of such as steering device without directional deviations on the trajectory of the tugger train.

The steering device requires energy for the determination or measurement of the state variables and/or movement variables, for the electronic control unit and for the motor-powered drive. The required energy can be made available, for example, by the towing vehicle in an electrical, pneumatic or hydraulic form and can be transmitted to the individual axle modules by means of electric leads, such as cables. Alternatively it is also possible that the required energy can be made available from the rotational movement of the respective wheels of the axle modules, for example by using an electric generator, with the result that the required energy is generated at the respective axle module itself. So that energy can be made available, at least temporarily, even when the tugger train is stationary, in this embodiment each axle module preferably has an energy accumulator.

A last axle module when viewed in the direction of travel of the tugger train is connected by its first cantilever arm preferably to a transportation module and by its second cantilever arm preferably to a bogie frame having at least one wheel. The last axle module when viewed in the direction of travel forms the termination of the tugger train. Behind the last axle module when viewed in the direction of travel, there is no further transportation module arranged which could serve to orient the wheel axle of the last axle module. In order to be able to compensate this, a bogie frame is preferably arranged behind the last axle module, which bogie frame is connected to the second cantilever arm. The bogie frame which can have one wheel, or else can also be embodied as a wheel axle with two wheels, is connected to the second cantilever arm either so as to be rotatable about a rotational axis in a vertical direction with respect to the longitudinal extent of the second cantilever arm, like the wheel axle of the last axle module with respect to the second cantilever arm, or fixedly or rigidly.

In order to be able to ensure directional stability of the entire tugger train during steady-state circular travel of the tugger train, there is preferably provision that a Bissell bogie is arranged between the last axle module when viewed in the direction of travel of the tugger train and the bogie frame. The arrangement of a Bissell bogie is advantageous, in particular, when the length of the second cantilever arm of the last axle module, which is arranged between the articulated connection of the last axle module and the bogie frame, is greater than or smaller than half the distance between two axle modules which are arranged one behind the other and between which a transportation module is arranged.

The Bissell bogie can preferably have a connecting rod which is connected by a first end to the wheel axle of the last axle module and by a second end, lying opposite the first end, to a wheel axle of the bogie frame.

Furthermore it is also possible that the Bissell bogie has a first connecting rod, a second connecting rod and a guide element which is mounted in a displaceably movable fashion on the second cantilever arm of the last axle module when viewed in the direction of travel, wherein the first connecting rod can be connected to the guide element and to the wheel axle of the last axle module, and wherein the second connecting rod can be connected to the guide element and to a wheel axle of the bogie frame.

If the steering device has a motor-powered drive and an electronic control unit, a bogie frame and a Bissell bogie are no longer necessary.

Furthermore, at least two transportation modules can be provided in the form of U-shaped supporting frames, wherein the at least two transportation modules preferably have at their upper ends at least one outwardly directed supporting arm each with a coupling element, wherein supporting arms, arranged opposite one another, of transportation modules which are arranged adjacent to one another are preferably coupled to one another in an articulated fashion by means of the coupling elements. The coupling elements of supporting arms which are arranged opposite one another can be connected to a full-floating axle arranged on the articulated connection.

The object according to the invention is also achieved by means of a method for steering a trackless tugger train which is embodied and developed as described above and in which a steering angle of the steering device of an axle module is adapted to a trajectory of the tugger train. Particularly good directional stability of the tugger train can be achieved over the length of the tugger train by adapting the steering angle of the steering device of each axle module of the tugger train, in which the individual axle modules follow a trajectory of the tugger train as precisely as possible. In this context, the steering angle for each steering device is set independently of the steering angles of the other steering devices of the other axle modules, with the result that each steering device of the individual axle modules operates autonomously with respect to the steering devices of the other axle modules and can be readjusted according to a corresponding calculation process. In order to set the steering angle, each individual steering device preferably has a motor-powered drive and an electronic control unit.

In order to increase the directional stability further, there is preferably provision that during a travel motion of the tugger train, the adaptation of steering angle is carried out continuously, at intervals which follow one another within a short period of time. In this context, the steering angle during a travel motion of the tugger train is preferably determined again repeatedly at defined time intervals which follow one another in short succession, with the result that the steering angle of a steering device of an axle module can be corrected continuously during the entire travel motion of the tugger train, and correspondingly adapted to the trajectory of the tugger train.

In order to adapt the steering angle, an axle centre point of the axle module to be steered and an axle centre point of the axle module arranged directly ahead thereof, when viewed in the direction of travel of the tugger train, are preferably determined. In order to determine the axle centre points or the coordinates of the axle centre points, state variables and/or movement variables such as the accelerations and/or the speeds at two different points on the wheel axle of the axle module, the rotational acceleration of the wheel axle about its vertical axis extending perpendicularly with respect to the direction of travel of the tugger train, the rotational speeds of the two wheels of an axle module, the wheel loads or wheel contact forces and/or the angles between the wheel axle and the cantilever arm of the axle module arranged ahead of or behind said wheel axle can be determined. These state variables and/or movement variables can be measured locally at the corresponding axle module, with the result that a data-transmitting connection between the individual axle modules via leads or by radio is not necessary. However, it is alternatively also possible for the state variables and/or movement variables of the axle module which is to be adjusted or steered to be determined by communication with the axle module which is arranged immediately ahead thereof when viewed in the direction of travel of the tugger train. If the axle centre points of the respective axle modules are determined, the distance between the axle centre point of the axle module which is to be adjusted or steered and the axle centre point of the axle module which is arranged directly ahead thereof when viewed in the direction of travel of the tugger train can be obtained. If the distance between the axle centre points is known, variables required for the steering control of the wheel axle of the axle module to be steered can be determined by means of this data and by means of suitable algorithms, with the result that the steering angle of the axle module which is to be adjusted or steered can be changed in such a way that the axle centre point of the axle module which is to be adjusted or steered is steered again to the trajectory which is provided.

BRIEF DESCRIPTION OF THE DRAWINGS

Further measures which improve the invention are presented in more detail below together with the description of preferred exemplary embodiments of the invention with reference to the figures. In the drawings.

DETAILED DESCRIPTION OF THE PREFERRED EMBODIMENTS

Figure 1:
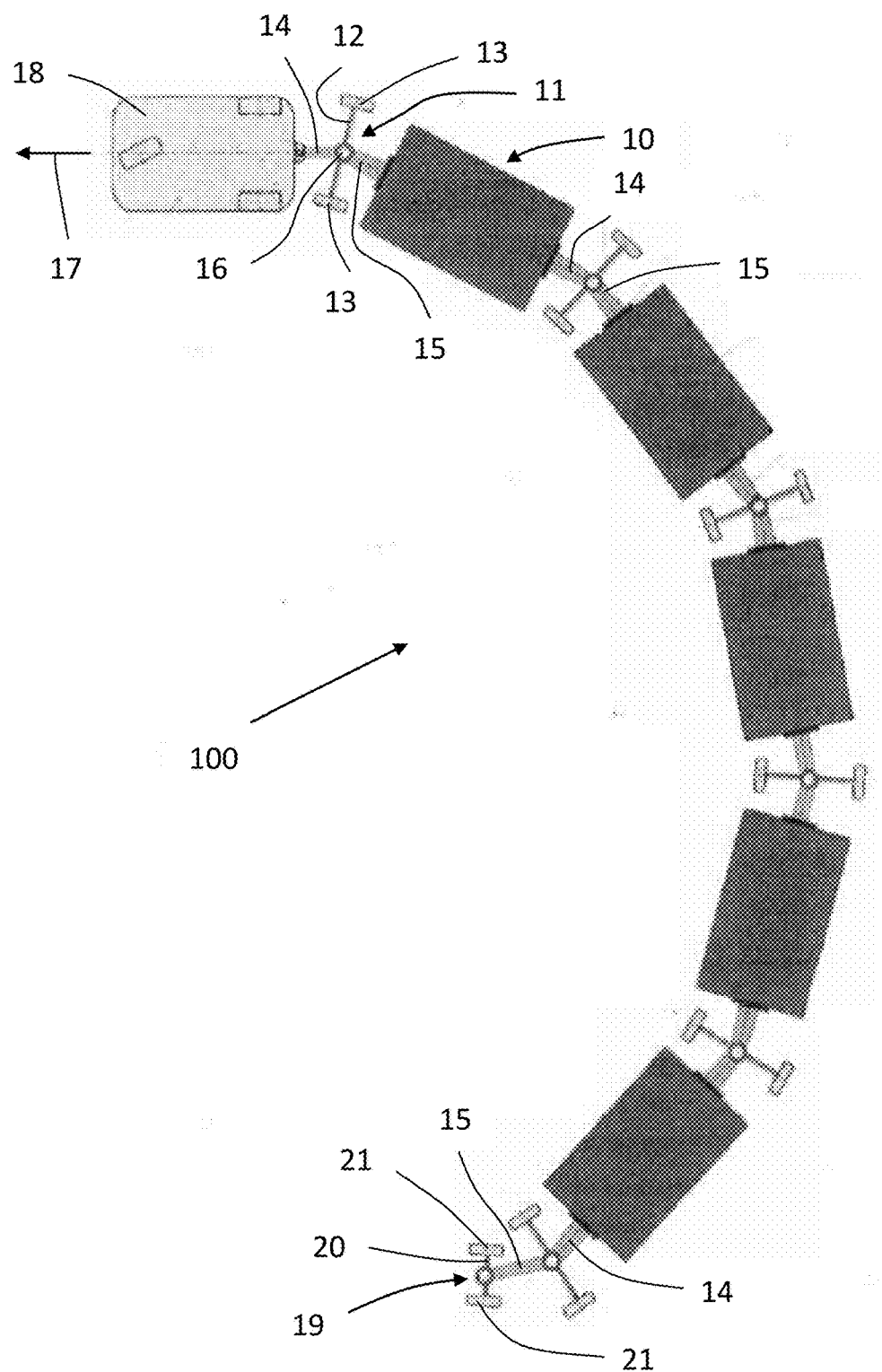
FIG. 1 shows a schematic illustration of a trackless tugger train according to the invention.

FIG. 1 is a schematic view of a trackless tugger train 100. The tugger train 100 has a plurality of transportation modules 10, here five, arranged one behind the other. Each transportation module 10 is arranged between two axle modules 11.

The axle modules 11 each have a wheel axle 12 with two wheels 13 arranged thereon. Furthermore, each axle module 11 has a first cantilever arm 14 and a second cantilever arm 15, wherein the cantilever arms 14, 15 are connected to one another approximately centrally along the longitudinal extent of the wheel axle 12 via an articulated connection 16, with the result that the cantilever arms 14, 15 can be rotated relative to one another.

In the case of an axle module 11 which is arranged between two transportation modules 10, the first cantilever arm 14 is connected to a front transportation module 10 when viewed in the direction of travel 17, and the second cantilever arm 15 is connected to a rear transportation module 10, when viewed in the direction of travel 17. The first axle module 11, when viewed in the direction of travel 17, and the last axle module 11, when viewed in the direction of travel 17, are exceptions to this. In the case of the first axle module 11 when viewed in the direction of travel 17, the first cantilever arm 14 is connected to a towing vehicle 18 which tows the tugger train 100. The second cantilever arm 15 is connected to the first transportation module 10 of the tugger train 100. In the case of the last axle module 11 when viewed in the direction of travel 17, the first cantilever arm 14 is connected to the last transportation module 10 of the tugger train 100. The second cantilever arm 15 of the last axle module 11 when viewed in the direction of travel 17 is connected to a bogie frame 19 which, in the embodiment shown here, is formed by a wheel axle 20 with two wheels 21, wherein the wheel axle 20 of the bogie frame 19 has a shorter length than the wheel axles 12 of the axle modules 11.

Each axle module 11 has, in addition to its wheel axle 12 and the two cantilever arms 14, 15, a steering device (not illustrated in FIG. 1.). The steering device is shown in various embodiments in FIGS. 4-10. The steering devices of the axle modules 11 are each embodied in such a way that each steering device steers the axle module 11 which is assigned to it, independently of a steering device of another axle module 11. The steering devices of the individual axle modules 11 are not coupled or connected to one another, but instead the steering device of each axle module 11 operates independently of the steering devices of the other axle modules 11, with the result that the steering devices of the individual axle modules 11 are not operatively connected to one another.

Figure 2:
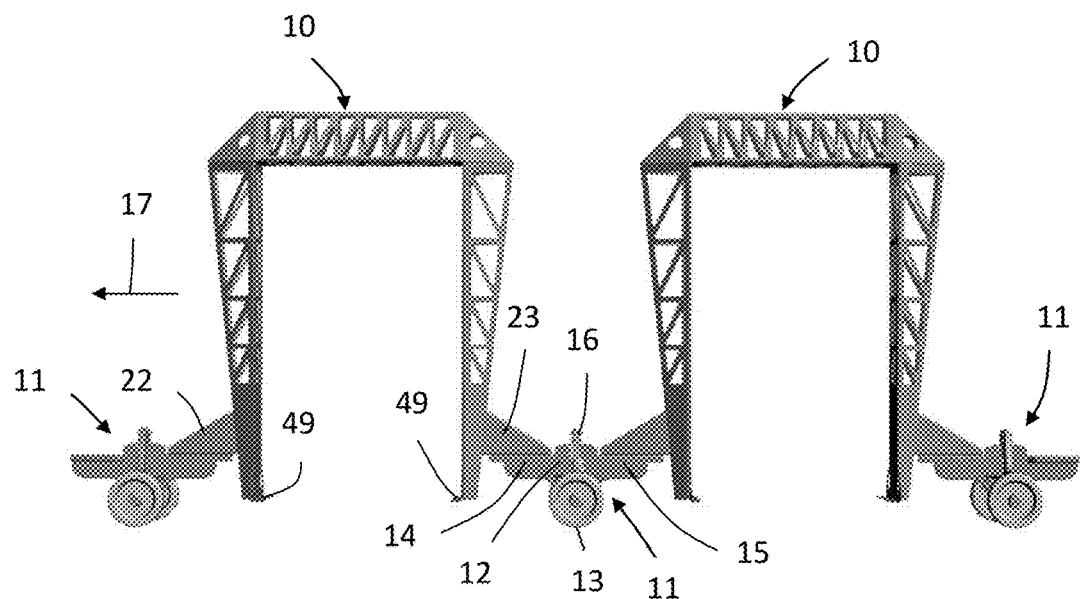
FIG. 2 shows a schematic illustration of a detail of the tugger train which is shown in FIG. 1 and which has three axle modules and two transportation modules.

FIG. 2 shows a detail of a tugger train 100 with two transportation modules 10 which are arranged one behind the other and which are each arranged between two axle modules 11. The transportation modules 10 are each embodied in the form of U-shaped supporting frames which can be loaded and unloaded with transportation loads from both sides without any impediments. The transportation modules 10 have for this purpose suitable devices for picking up the loads. For example, in each case one or more angular profiles 49 can be arranged as load pickup means at lower ends of the transportation modules 10 which are directed towards the underlying surface, as shown in FIG. 2.

Each transportation module 10 has two connecting elements 22, 23, wherein the front connecting element 22 when viewed in the direction of travel 17 is rigidly connected to the second cantilever arm 15 of an axle module 11 arranged ahead of the transportation module 10, and wherein the rear connecting element 23 when viewed in the direction of travel 17 is rigidly connected to the first cantilever arm 14 of an axle module 11 which is arranged behind the translation module 10, with the result that no rotational movement is possible between the cantilever arms 14, 15 and the connecting elements 22, 23, for example when the tugger train 100 is cornering. In order to be able to release the transportation modules 10 from the axle modules 11 again, the connections of the connecting elements 22, 23 to a respective cantilever arm 14, 15 are embodied in a releasable fashion. In order to increase the stability, the connecting elements 22, 23 are embodied in a wedge shape in the embodiment shown here.

In the embodiment of the transportation modules 10 in the form of U-shaped supporting frames, very high forces act on the transportation modules 10, since the entire tensile force is transmitted by the towing vehicle 18 via each transportation module 10 with peak loads and torques. As a result, high bending torques occur in the transportation modules 10 which are embodied in the form of U-shaped supporting frames. In order to reduce the forces and torques acting on the transportation modules 10, an alternative embodiment to FIG. 2 is shown in FIG. 20.

Figure 20:
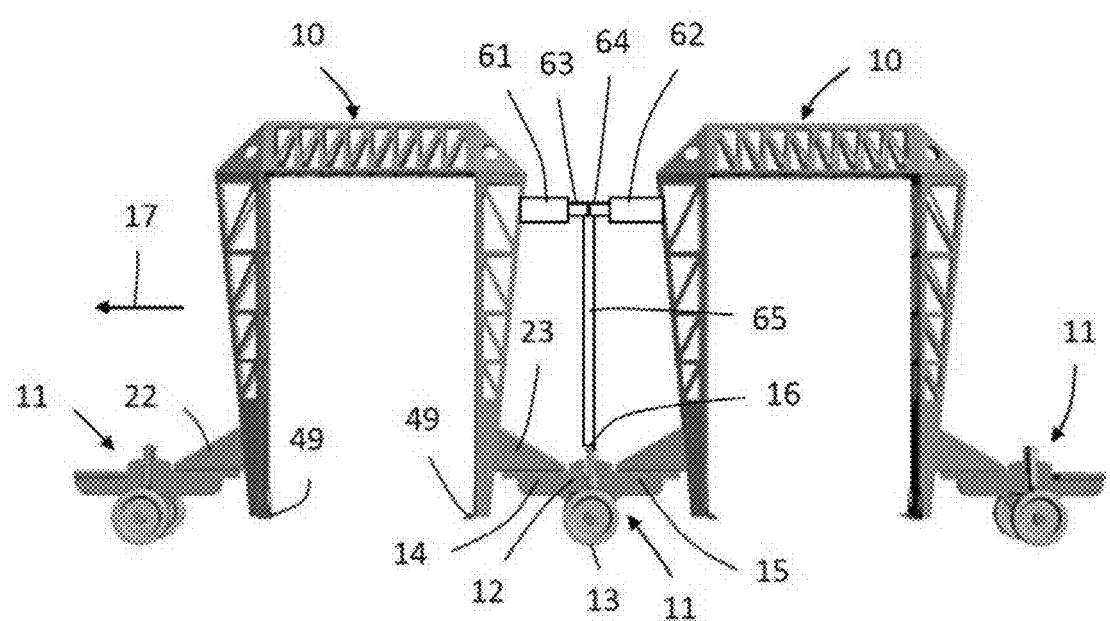
FIG. 20 shows a schematic illustration of a detail of the tugger train which is shown in FIG. 1 and has three axle modules and two transportation modules according to a further embodiment.

FIG. 20 shows, like FIG. 2, a detail of a tugger train 100 with two transportation modules 10 which are arranged one behind the other and which are each arranged between two axle modules 11. On the transportation modules 10, in each case an outward directed supporting arm 61, 62 is arranged at their upper ends. At the free ends of the supporting arms 61, 62, in each case a coupling element 63, 64 is arranged, for example, in the form of a hinge. The two supporting arms 61, 62, lying opposite one another, of transportation modules which are arranged adjacent to one another are coupled to one another in an articulated fashion via the coupling elements 63, 64 in that the coupling elements 63, 64 engage one in the other, for example. The coupling elements 63, 64 are in turn connected to a full-floating axle 65 which is arranged on the articulated connection 16. The full-floating axle 65 extends perpendicularly with respect to the direction of travel 17 starting from the articulated connection 16 and extending to the coupling elements 63, 64. The full-floating axle 65 forms a rotational axis between the transportation modules 10 which are arranged adjacent to one another, concentrically with respect to the vertical axis of the articulated connection 16. By means of the articulated connection of the transportation modules 10 to one another at their upper ends by means of the supporting arms 61, 62 of the coupling elements 63, 64 and the full-floating axle 65, the forces acting on the transportation modules 10 can be passed on directly to the other transportation modules 10, while bypassing the steering device of the axle modules 11, and can therefore be distributed uniformly among all the transportation modules 10.

Figure 3:
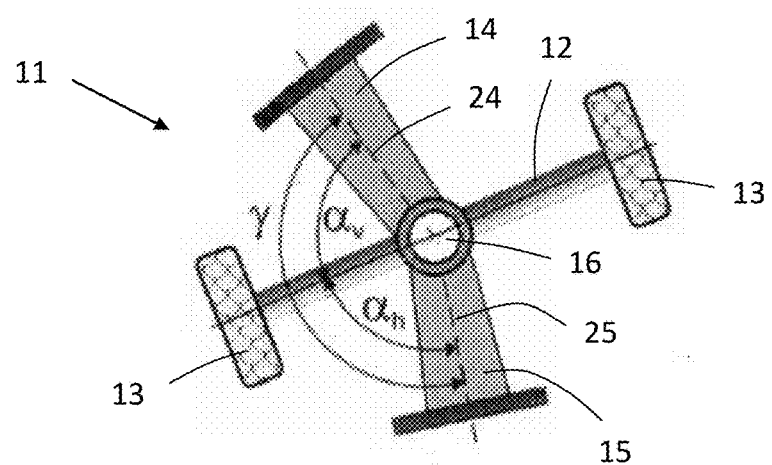
FIG. 3 shows a schematic illustration of an axle module of a tugger train as shown in FIG. 1.

FIG. 3 shows a schematic illustration of an axle module 11, with a wheel axle 12 on which two wheels 13 are arranged, and with a first cantilever arm 14 and a second cantilever arm 15 connected to the first cantilever arm 14 via an articulated connection 16. The longitudinal axes 24, 25 of the two cantilever arms 14, 15 which are connected to the wheel axle 12 by the articulated connection 16 form a bending angle $\gamma$ of the axle module 11. In the case of straight-ahead travel of the tugger train 100, the bending angle $\gamma$=180°. In the case of left-handed cornering, the bending angle $\gamma$ is <180°, as is shown in FIG. 3. And in the case of right-handed cornering, the bending angle $\gamma$ is >180°.

The position of the wheel axle 12 divides the bending angle $\gamma$ into a first, front steering angle $\alpha_v$, which is formed between the wheel axle 12 and the first cantilever arm 14 or the longitudinal axis 24 of the first cantilever arm 14, and into a second, rear steering angle $\alpha_h$, which is formed between the wheel axle 12 and the second cantilever arm 15 or the longitudinal axis 25 of the second cantilever arm 15, with the result the following is true: $\gamma=\alpha_v+\alpha_h$.

FIGS. 4 to 7 show embodiments of a steering device in which the two steering angles $\alpha_v$ and $\alpha_h$ are always of the same magnitude. The steering device is therefore embodied in such a way that it steers the wheel axle 12 in such a way that the wheel axle 12 is always oriented in the direction of the angle-bisector of the bending angle $\gamma$, wherein the angle-bisector is defined in such a way that in the angle-bisector the steering angles $\alpha_v$ and $\alpha_h$ are of the same magnitude.

Figure 4:
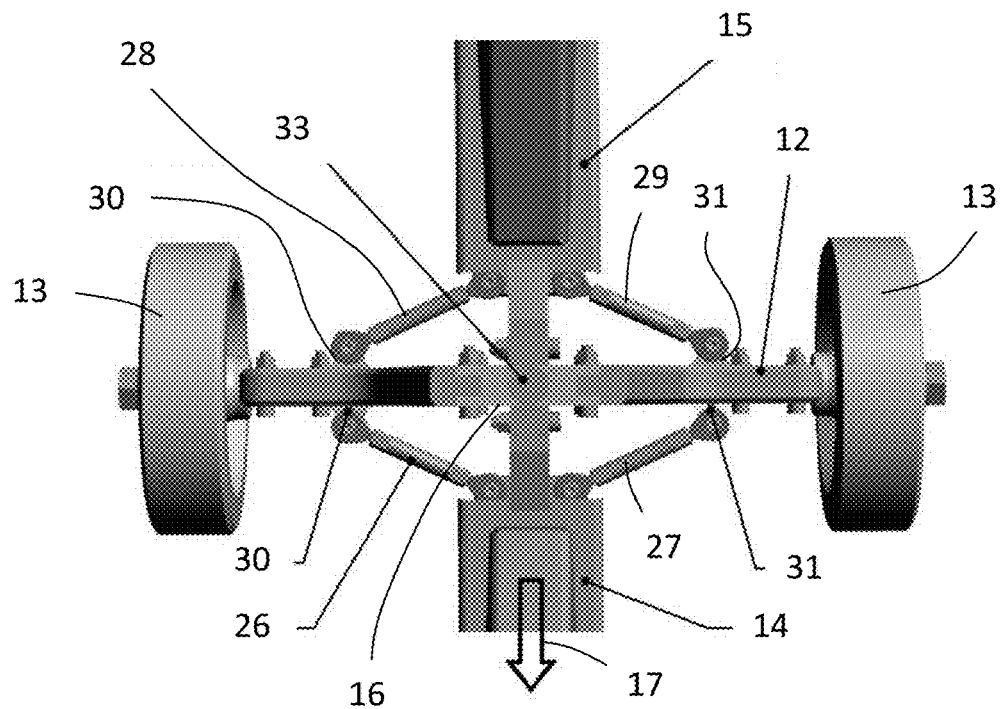
FIG. 4 shows a further schematic illustration of an axle module of a tugger train as shown in FIG. 1.
Figure 5:
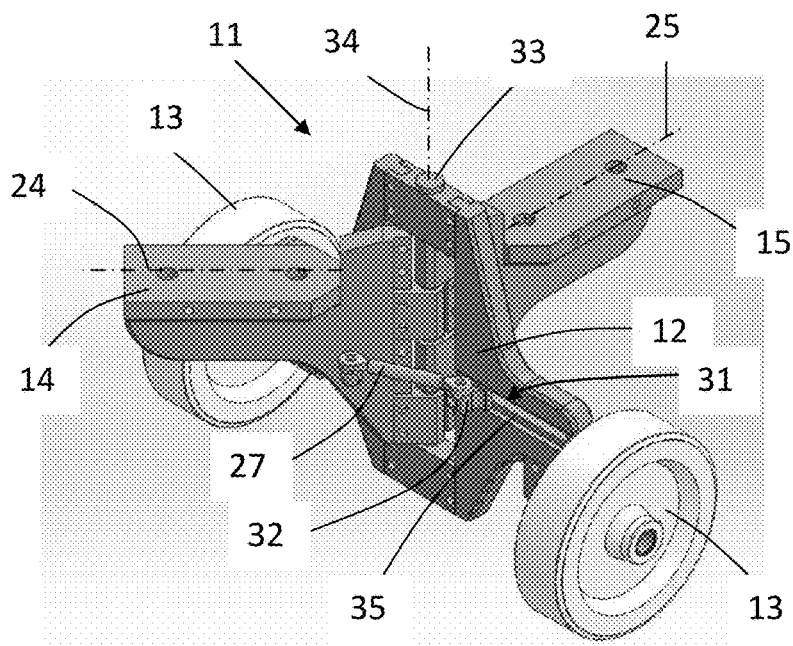
FIG. 5 shows a further schematic illustration of an axle module of a tugger train as shown in FIG. 1.

FIGS. 4 and 5 show an embodiment of a steering device in which the steering device is embodied in the form of a scissor mechanism. The steering device is embodied in the embodiment shown here from four connecting rods 26, 27, 28, 29, which are each guided by one of their ends in a linear guide 30, 31. A first and a third connecting rod 26, 28 are each connected by a first end to the first cantilever arm 14 and by a second end to the wheel axle 12. A second and a fourth connecting rod 27, 29 are each connected by a first end to the second cantilever arm 15 and by a second end to the wheel axle 12. The attachment of the connecting rods 26, 27, 28, 29 to the cantilever arms 14, 15 is embodied in each case in a positionally fixed fashion, with the result that the connecting rods 26, 27, 28, 29 cannot be displaced along the cantilever arms 14, 15. However, the attachment of the connecting rods 26, 27, 28, 29 to the cantilever arms 14, 15 is embodied in an articulated fashion, with the result that the connecting rods 26, 27, 28, 29 can be pivoted about the attachment point on the cantilever arms 14, 15, for example when the tugger train 100 is cornering. In contrast, the connecting rods 26, 27, 28, 29 are guided in the linear guide 30, 31 on the wheel axle 12 in a linear fashion, with the result that the connecting rods 26, 27, 28, 29 can be displaced along the longitudinal extent of the wheel axle 12.

The linear guides 30, 31 each extend to the right and left when viewed from the centre of the wheel axle 12, wherein a first linear guide 30 extends to the left of the articulated connection 16, when viewed in the direction of travel 17, in the direction of the wheel 13, and a second linear guide 31 extends to the right of the articulated connection 16, when viewed in the direction of travel 17, in the direction of the wheel 13. The linear guides 30, 31 have, in the wheel axle 12, groove-shaped or slot-shaped cut-outs 35, in each of which a sliding element 32 of the linear guides 30, 31 is guided. On the sliding elements 32, in each case two of the connecting rods 26, 27, 28, 29 are attached by means of a pivoting joint connection, wherein the first and second connecting rods 26, 28 are attached together on a sliding element 32 of the first linear guide 30 by means of a pivoting joint connection, and wherein the third and fourth connecting rods 27, 29 are attached together on a sliding element 32 of the second linear guide 31 by means of a pivoting joint connection.

The articulated connection 16 has here a vertical pivoting joint 33, wherein the first cantilever arm 14 and the second cantilever arm 15 are connected to the vertical pivoting joint 33. The vertical pivoting joint 33 has a rotational axis 34 which is embodied vertically with respect to the longitudinal extent or vertically with respect to the longitudinal axis 24, 25 of the cantilever arms 14, 15, with the result that when the tugger train 100 is cornering the cantilever arms 14, 15 can be pivoted about the vertical pivoting joint 33, which is embodied in the form of a shaft, or about the rotational axis 34 of the vertical pivoting joint 33, as is indicated in FIG. 5. During cornering, the corresponding connecting rods 26, 27, 28, 29 are displaced in the linear guide 30, 31 in such a way that by means of the connecting rods 26, 27, 28, 29 the corresponding cantilever arm 14, 15 is pivoted to the side necessary for cornering.

Figure 6:
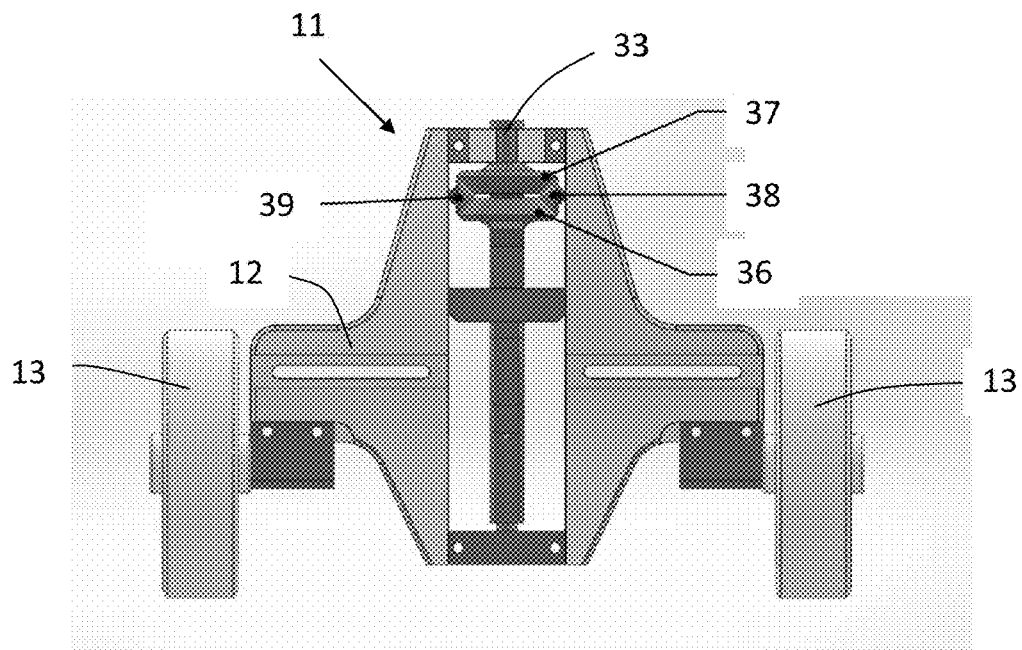
FIG. 6 shows a further schematic illustration of an axle module of a tugger train as shown in FIG. 1.
Figure 7:
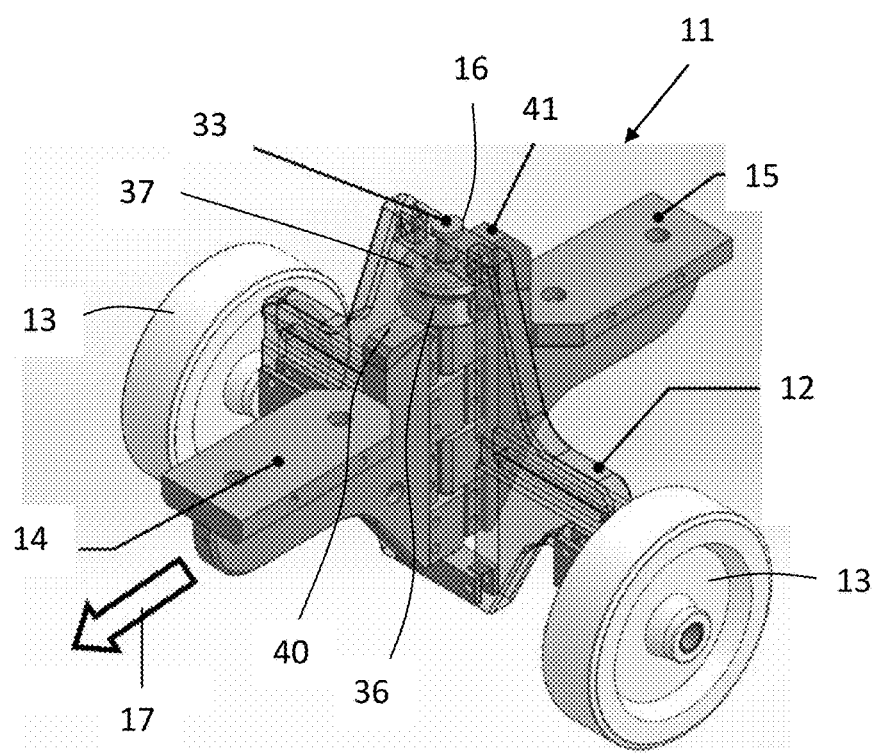
FIG. 7 shows a further schematic illustration of an axle module of a tugger train as shown in FIG. 1.

FIGS. 6 and 7 show an embodiment of a steering device in which the steering device is embodied in the form of a gear unit.

The gear unit has a first gear wheel 36, a second gear wheel 37, a third gear wheel 38 and a fourth gear wheel 39, wherein all the gear wheels 36, 37, 38, 39 are embodied here as toothed wheels, in particular as bevel gears. The first gear wheel 36 is connected to the first cantilever arm 14 by a connecting element 40, wherein the first gear wheel 36 forms a drive wheel. The second gear wheel 37 is connected to the second cantilever arm 15 via a connecting element 41, wherein the second gear wheel 37 forms a drive wheel. The first gear wheel 36 and the second gear wheel 37 are arranged parallel to one another on the vertical pivoting joint 33 of the articulated connection 16. The third gear wheel 38 and the fourth gear wheel 39, which are arranged lying opposite one another, are each connected to the wheel axle 12 or the frame of the wheel axle 12. The third gear wheel 38 and the fourth gear wheel 39 are each arranged between the first gear wheel 36 and the second gear wheel 37, with the result that, for example, a rotational movement of the first gear wheel 36 can be transmitted to the second gear wheel 37 via the third and fourth gear wheels 38, 39. As a result of the fact that in the embodiment of the gear unit shown here two gear wheels 38, 39 are provided which are connected to the wheel axle 12 and are arranged between the first gear wheel 36 and the second gear wheel 37, force can be applied symmetrically to the wheel axle 12 or to the frame of the wheel axle 12 when there is a rotational movement of the gear wheels 36, 37, 38, 39.

The gear unit forms a type of "minus gear unit" which has a gear stage. A rotational movement of the first cantilever arm 14, for example in the clockwise direction, can be transformed into a rotational movement of the second cantilever arm 15 in the anti-clockwise direction, and vice versa, by means of the gear wheels 36, 37, 38, 39 which engage one in the other. The 1:1 transmission ratio of the gear unit, which is implemented by the same pitch circle diameters of the first gear wheel 36 embodied as a drive wheel and the second gear wheel 37 embodied as an output wheel, permits the wheel axle 12 to be steered into an angle-bisecting position between the first cantilever arm 13 and the second cantilever arm 15, with the result that the first, front steering angle $\alpha_v$ corresponds to the second, rear steering angle $\alpha_h$.

Figure 8:
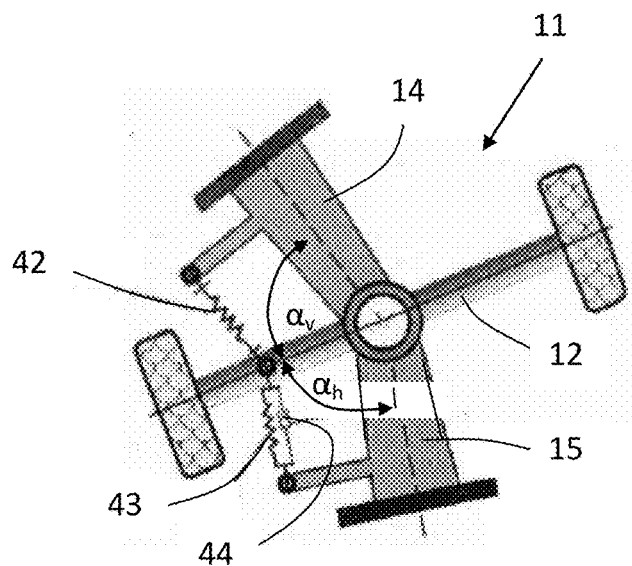
FIG. 8 shows a further schematic illustration of an axle module of a tugger train as shown in FIG. 1.
Figure 9:
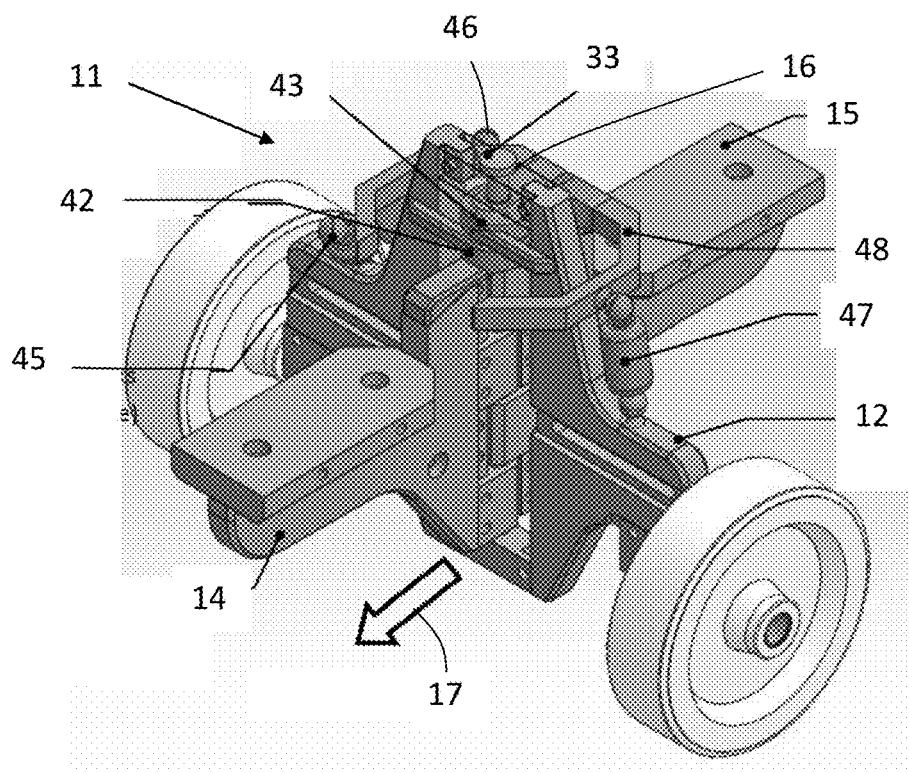
FIG. 9 shows a further schematic illustration of an axle module of a tugger train as shown in FIG. 1.
Figure 10:
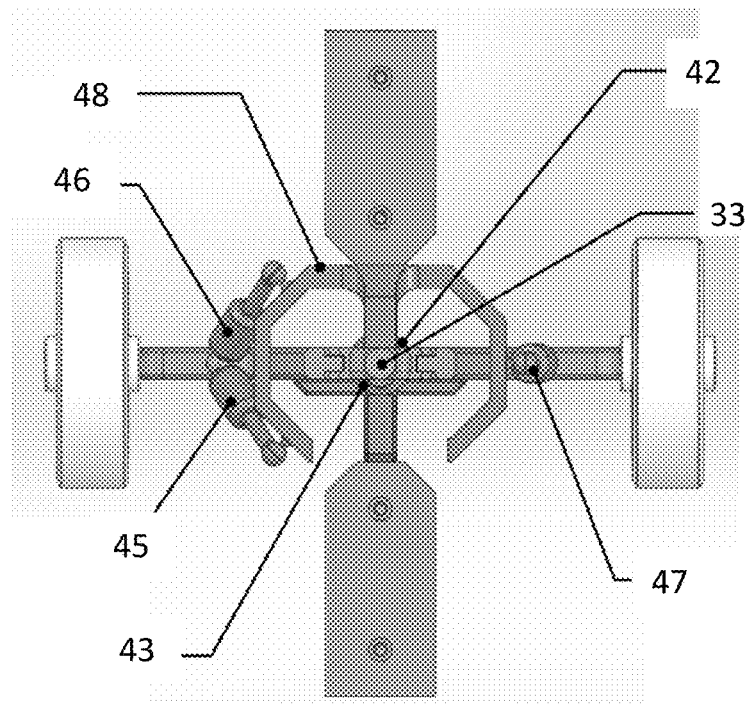
FIG. 10 shows a further schematic illustration of an axle module of a tugger train as shown in FIG. 1.

FIGS. 8 to 10 show embodiments of the steering device as a spring-damper system.

In the embodiment shown in FIG. 8 of a spring-damper system, a first spring element 42 is arranged between the wheel axle 12 and the first cantilever arm 14. A second spring element 43 is arranged between the wheel axle 12 and the second cantilever arm 15. Both the first spring element 42 and the second spring element 43 are embodied here as linear springs. In addition, a damper element 44 is arranged between the wheel axle 12 and the second cantilever arm 15, parallel to the second spring element 43. As a result of the damper element 44, when the tugger train 100 is cornering the second cantilever arm 15 is rotated more slowly with respect to the wheel axle 12 than the first cantilever arm 14. The first, front steering angle $\alpha_v$ therefore changes more quickly during cornering than the second, rear steering angle $\alpha_h$, but the spring-damper system also operating in such a way that even when there is a temporarily different magnitude of the first, front steering angle $\alpha_v$ compared to the second, rear steering angle $\alpha_h$, the steering device attempts to steer the wheel axle 12 into an angle-bisecting position between the first cantilever arm 14 and the second cantilever arm 15.

In the case of straight-ahead travel of the tugger train 100, i.e. when the bending angle γ=180°, the spring elements 42, 43 are in a force equilibrium. In contrast, when the tugger train 100 is cornering, one of the spring elements 42, 43 is stressed and the other spring element 42, 43 is relaxed, with the result that an imbalance in forces is brought about, but the spring elements 42, 43 attempt to compensate this imbalance in forces again as quickly as possible in that the wheel axle 12 is steered again into an angle-bisecting position between the first cantilever arm 14 and the second cantilever arm 15.

FIGS. 9 and 10 show an embodiment of a steering device as a spring-damper system in which a first spring element 42 is also connected to the wheel axle 12 and to the first cantilever arm 14, and a second spring element 43 is connected to the wheel axle 12 and to the second cantilever arm 15. The two spring elements 42, 43 are embodied here as torsion or torsional springs which are arranged on the vertical pivoting joint 33 of the articulated connection 16. In addition, the spring-damper system shown in FIGS. 9 and 10 has three damper elements 45, 46, 47, which are each connected by a first end to the wheel axle 12 and by a second end to an attachment frame 48 connected to the second cantilever arm 15. The attachment frame 48 is embodied essentially in a U shape when viewed from above in a plan view. A first damper element 45 and a second damper element 46 are arranged inclined at an angle <90° with respect to the longitudinal extent of the wheel axle 12 and are connected to a first left-hand side, when viewed in the direction of travel 17, of the wheel axle 12. A third damper element 47 is arranged at an angle of approximately 90° and therefore vertically with respect to the longitudinal extent of the wheel axle 12, and is connected to a second right-hand side, when viewed in the direction of travel, of the wheel axle 12, lying opposite the first side.

The two spring elements 42, 43 which are arranged axially with respect to one another and with respect to the vertical pivoting joint 33 permit the wheel axle 12 to be steered into an angle-bisecting position between the first cantilever arm 14 and the second cantilever arm 15. However, the angle-bisecting position is to be reached with a delay in the case of cornering in order to achieve the highest possible directional stability. When entering the bend it is therefore advantageous if the second, rear steering angle $\alpha_h$ is larger for a defined time than the first, front steering angle $\alpha_v$. When exiting the bend it is advantageous if the second, rear steering angle $\alpha_h$ is smaller for a defined time than the first, front steering angle $\alpha_v$. This type of delay in the splitting of the angle is implemented by using the linear damper elements 45, 46, 47. The specific arrangement and position of the damper elements 45, 46, 47, as shown in FIGS. 9 and 10, permits the kinematics of the axle modules 11 to be utilized to "switch off" the damping effect depending on the position of the wheel axle 12. As result, an ideal trailing behaviour and a high level of directional stability of the tugger train 100 is implemented over a large number of driving maneuvers.

When entering a bend, the first cantilever arm 14 is deflected outwards, as a result of which the first spring element 42 is stressed. A difference in torque between the first spring element 42 and the second spring element 43 which results from this forces the wheel axle 12 to move, wherein the wheel axle 12 is delayed in its movement or rotational movement by the damper elements 45, 46, 47. If the size of the first, front steering angle $\alpha_v$ increases, the effect of the damper elements 45, 46, 47 decreases owing to reducing differences in torque in the spring elements 42, 43 and the additional effect of the kinematics, until an angle-bisecting position of the wheel axle 12 is reached again, at which position the first, front steering angle $\alpha_v$ is equal to the second, rear steering angle $\alpha_h$.

Figure 11:
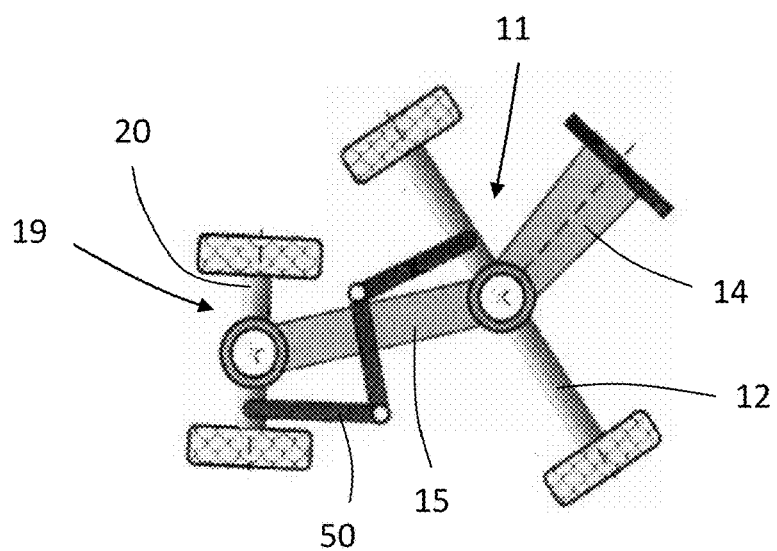
FIG. 11 shows a schematic illustration of a last axle module of a tugger train as shown in FIG. 1 and has a bogie frame arranged behind it.
Figure 12:
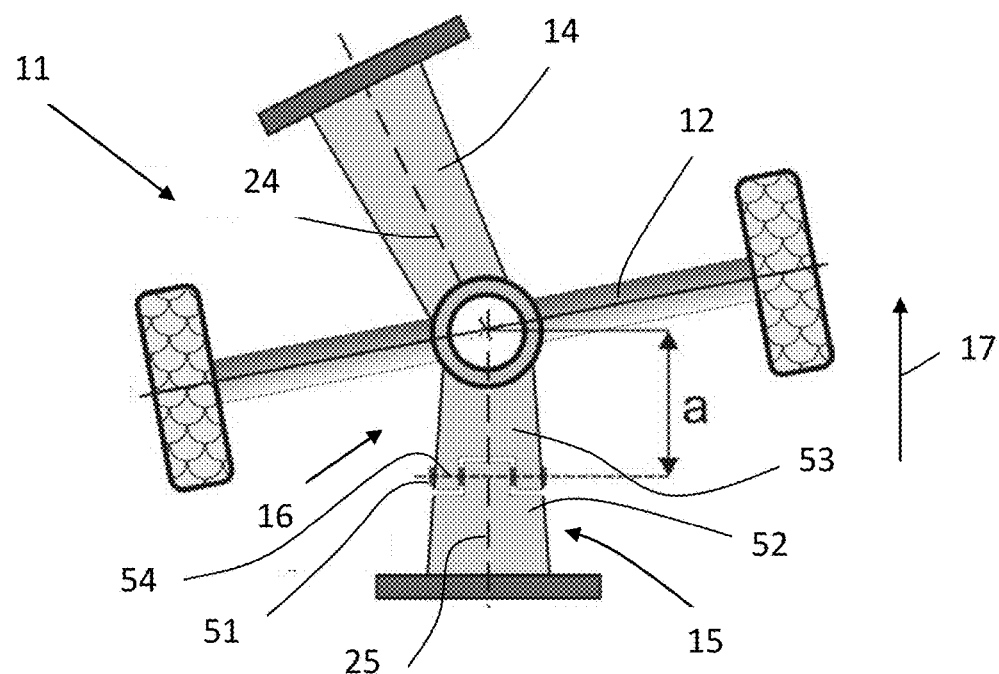
FIG. 12 shows a further schematic illustration of an axle module of a tugger train as shown in FIG. 1.

FIG. 11 shows once more an illustration of a detail of a connection of a bogie frame 19 to the last axle module 11 of the tugger train 100. The bogie frame 19, in particular the wheel axle 20 of the bogie frame 19, can, like the wheel axle 12 of the last axle module 11, be rotated in relation to the second cantilever arm 15, about a rotational axis vertically with respect to the longitudinal extent of the second cantilever arm 15. Steering kinematics, here in the form of a Bissell bogie 50, are embodied between the wheel axle 12 of the last axle module 11 and the bogie frame 19 or the wheel axle 20 of the bogie frame 19 in such a way that the bogie frame 19 is rotated with respect to the cantilever arm 15 with an equally large angle to the wheel axle 12 of the last axle module 11, but in the opposite direction. In the case of the axle module 11 shown in FIG. 12, the articulated connection 16 additionally has a horizontal pivoting joint 51 which is arranged here in the second cantilever arm 15 itself, with the result that the second cantilever arm 15 is divided into two component elements 52, 53 which are movable with respect to one another. The horizontal pivoting joint 51 is embodied here in the form of a shaft which is arranged transversely with respect to the longitudinal extent or longitudinal axis 25 of the second cantilever arm 15. The horizontal pivoting joint 51 therefore has a rotational axis 54 which, at least in the case of straight-ahead travel of the tugger train 100, extends transversely with respect to the direction of travel 17 of the tugger train 100 or extends transversely with respect to the longitudinal axis 24, 25 of the respective cantilever arm 14, 15 on which the horizontal pivoting joint 51 is arranged.

The distance a between the horizontal pivoting joint 51 and the wheel axle 12 is preferably embodied as small as possible. In the embodiment shown in FIG. 12, the distance a>0. It is particularly preferred if the distance a=0, wherein the horizontal pivoting joint 51 between the respective cantilever arm 14, 15 and the wheel axle 12 would preferably be embodied in the form of a Cardan joint.

Figure 13:
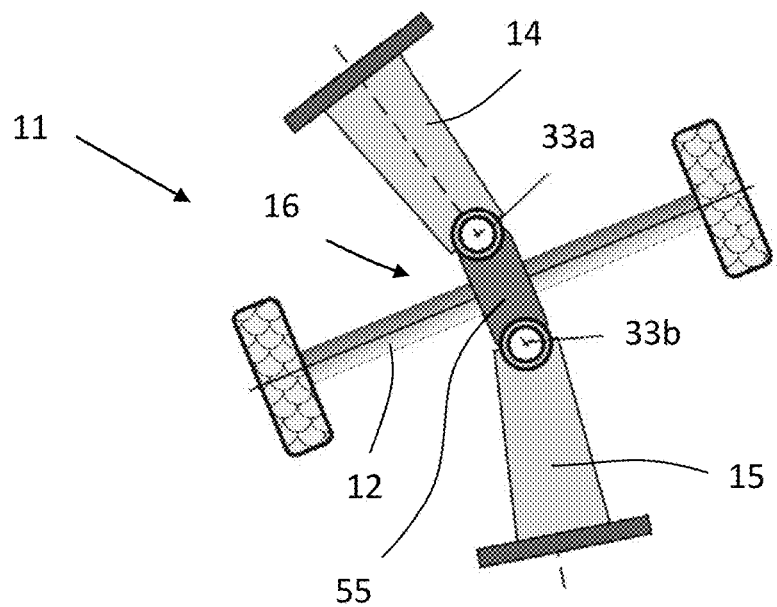
FIG. 13 shows a further schematic illustration of an axle module of a tugger train as shown in FIG. 1.

FIG. 13 shows a further embodiment of an axle module 11 in which the articulated connection 16 has not only a vertical pivoting joint but a first vertical pivoting joint 33a and a second vertical pivoting joint 33b. The first cantilever arm 14 is connected indirectly to the wheel axle 12 via the first vertical pivoting joint 33a, and the second cantilever arm 15 is connected indirectly to the wheel axle 12 via the second vertical pivoting joint 33b, wherein the first vertical pivoting joint 33a and the second vertical pivoting joint 33b are arranged on a common plate 55, which is in turn fixedly connected to the wheel axle 12.

Figure 15:
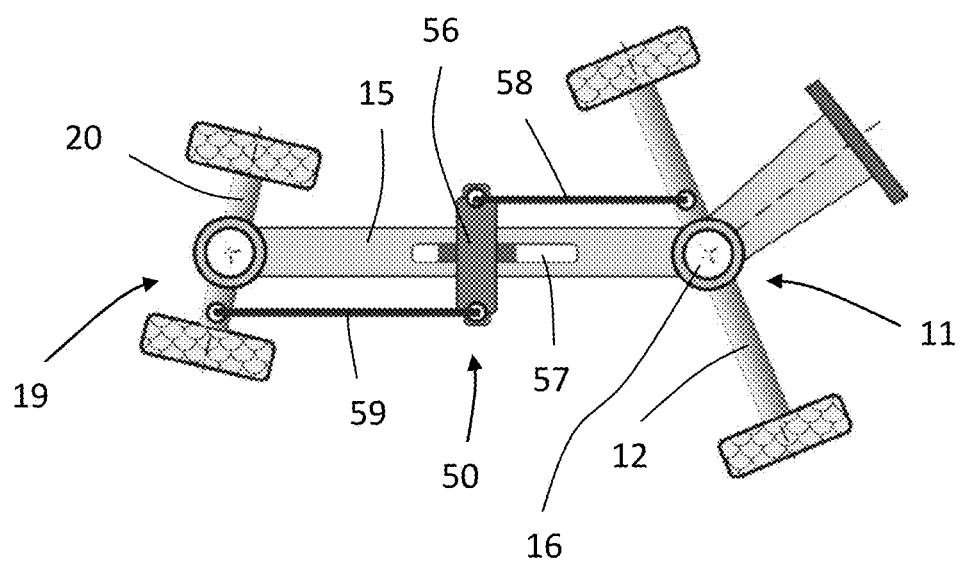
FIG. 15 shows a schematic illustration of a connection of a last axle module with a bogie frame in a tugger train as shown in FIG. 14.
Figure 17:
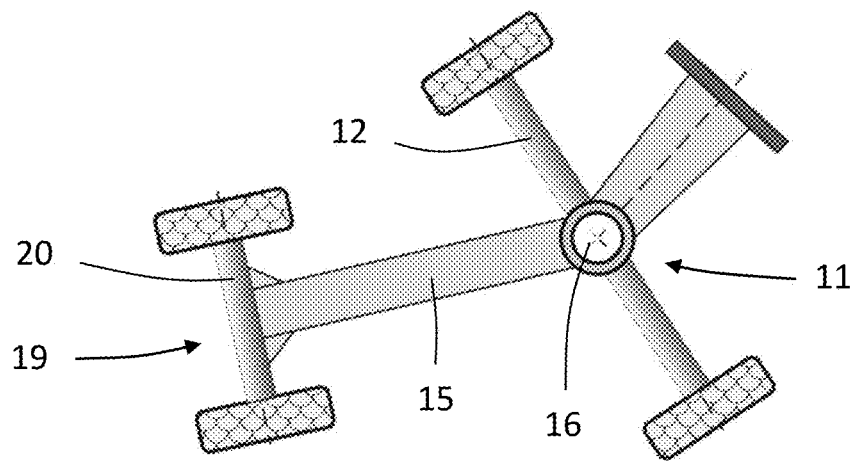
FIG. 17 shows a schematic illustration of a connection of a last axle module with a bogie frame in a tugger train as shown in FIG. 16.
Figure 19:
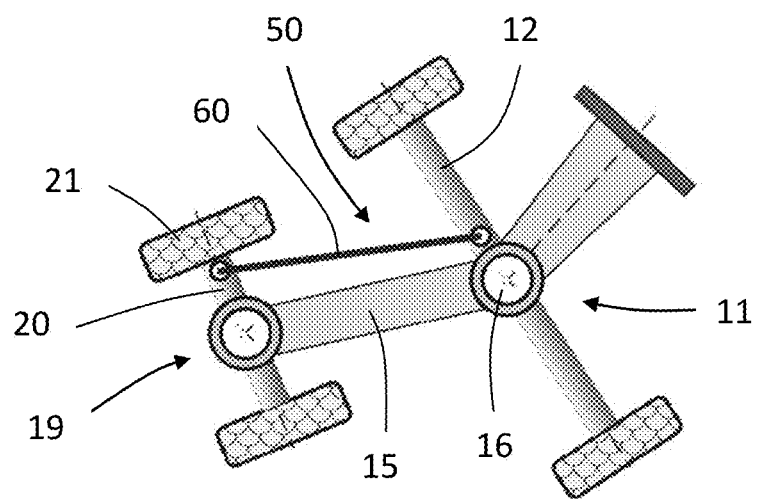
FIG. 19 shows a schematic illustration of a connection of a last axle module to a bogie frame in a tugger train as shown in FIG. 18.

Further possible embodiments of a connection of the last axle module 11, when viewed in the direction of travel 17 of the tugger train 100, to the bogie frame 19 are shown in FIGS. 15, 17 and 19.

Figure 14:
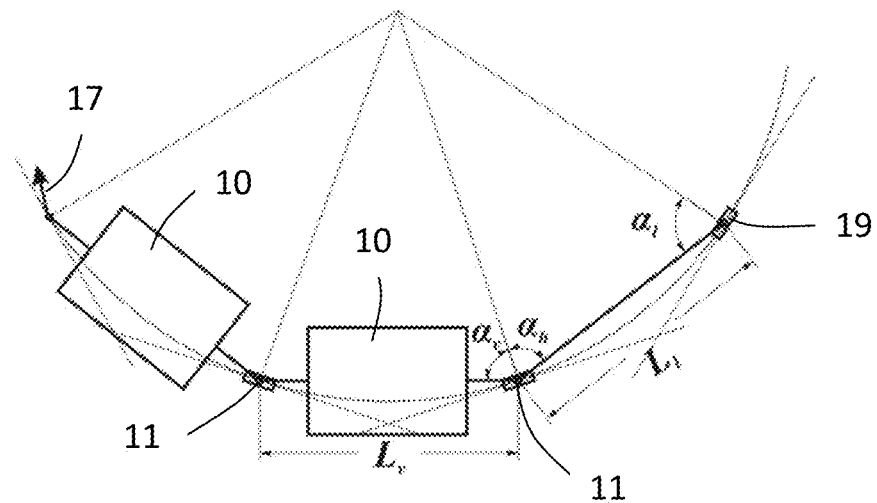
FIG. 14 shows a schematic illustration of geometry of steady-state circular travel of a tugger train embodied according to one possible embodiment.
Figure 16:
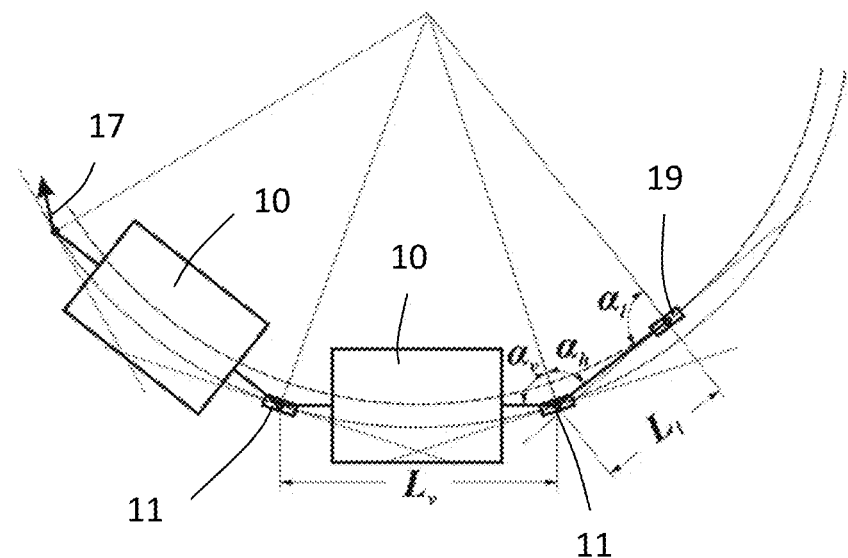
FIG. 16 shows a schematic illustration of geometry of steady-state circular travel of a tugger train embodied according to a further possible embodiment.
Figure 18:
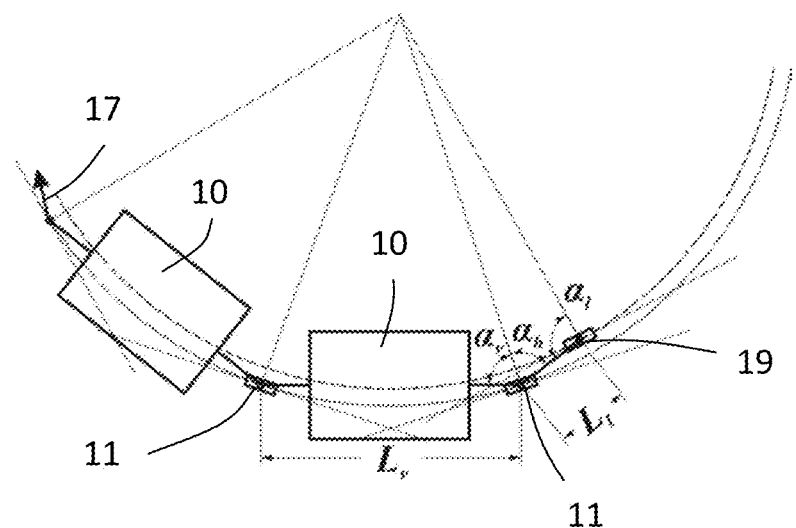
FIG. 18 shows a schematic illustration of geometry of steady-state circular travel of a tugger train embodied according to a further possible embodiment.

As is shown by means of FIGS. 14, 16 and 18, the method of operation of the steering kinematics for the bogie frame 19 depends on the length ratio of the length $L_l$, which constitutes the distance between the articulated connection 16 of the last axle module 11 and the bogie frame 19, and therefore the length of the second cantilever arm 15 of the last axle module 11, and the length $L_v$, which constitutes the distance between the last axle module 11 and an axle module 11 which is arranged ahead of the last axle module 11 when viewed in the direction of travel 17.

Given a length ratio of $L_l>0.5\ L_v$, the bogie frame 19 or the wheel axle 20 of the bogie frame 19 should be steered in the opposite direction to the last axle module 11 or the last wheel axle 12 of the last axle module 11, in order to be able to ensure directional stability of the entire tugger train 100 in the case of steady-state cornering of the tugger train 100.

FIG. 14 shows a boundary case in which a length ratio of $L_l=L_v$ is formed.

FIG. 15 shows possible counter-steering of the bogie frame 19 in the case of a length ratio of $L_l=L_v$, as is shown in FIG. 14. For this, a Bissell bogie 50 is arranged between the last axle module 11 and the bogie frame 19. The wheel axle 20 of the bogie frame 19 can be rotated relative to the second cantilever arm 15 of the last axle module 11, with the result that the steering angle $\alpha_l$ of the bogie frame 19 can be changed. The steering angle $\alpha_l$ of the bogie frame 19 is stretched between the second cantilever arm 15 and the wheel axle 20 of the bogie frame 19.

The Bissell bogie 50 has a guide element 56 which is displaceably guided along the longitudinal extent of the second cantilever arm 15 of the last axle module 11. The second cantilever arm 15 has a cut-out 57 in the form of an elongated hole which extends in the longitudinal direction of the second cantilever arm 15, wherein the guide element 56 is mounted in a displaceably movable fashion in the cut-out 57. The guide element 56 is embodied here in the form of a plate. The guide element 56 is connected to the wheel axle 12 of the last axle module 11 via a first connecting rod 58. The guide element 56 is connected to the wheel axle 20 of the bogie frame 19 via a second connecting rod 59. The second connecting rod 59 is mounted on an end section of the guide element 56 which is embodied opposite an end section of the guide element 56 at which the first connecting rod 58 is mounted on the guide element 56.

With the Bissell bogie 50 it is possible to ensure that the steering angle $\alpha_l$ of the bogie frame 19 is of the same size as the rear steering angle $\alpha_h$ which is stretched between the wheel axle 12 of the last axle module 11 and the second cantilever arm 15. As a result of the fact that a ratio of the steering angles of $\alpha_l=\alpha_h$ can be set with the Bissell bogie 50, directional stability of the entire tugger train can be ensured in the case of steady-state circular travel of the tugger train 100.

FIG. 16 shows a further embodiment in which a length ratio of $L_l=0.5\ L_v$ is formed. Given this length ratio, the wheel axle 20 of the bogie frame 19 should be constantly oriented perpendicularly with respect to the second cantilever arm 15 of the last axle module 11, with the result that a steering angle $\alpha_l$ of 90° is formed. As is illustrated in FIG. 17, for this purpose the bogie frame 19 or the wheel axle 20 of the bogie frame 19 can be fixedly or rigidly connected to the second cantilever arm 15. Given a length ratio of $L_l=0.5\ L_v$ a ratio of the steering angles of $\alpha_l=\alpha_h$ can also be set as result of this, so that directional stability of the entire tugger train can also be ensured here given steady-state circular travel of the tugger train 100.

FIG. 18 shows a further embodiment in which a length ratio of $L_l<0.5\ L_v$ is formed. Given such a length ratio, the wheel axle 20 of the bogie frame 19 should be steered in the same direction as the wheel axle 12 of the last axle module 11 when viewed in the direction of travel 17 of the tugger train 100, as is shown in FIG. 19, in order to ensure directional stability of the entire tugger train during steady-state circular travel of the tugger train 100. In order to achieve this, a connecting rod 60, which forms a Bissell bogie 50, is preferably arranged between the wheel axle 12 of the last axle module 11 and the wheel axle 20 of the bogie frame 19, which connecting rod 60 is mounted in an articulated fashion on the wheel axle 12 of the last axle module 11 and on the wheel axle 20 of the bogie frame 19. The Bissell bogie 50 is therefore formed only by a connecting rod 60 in this embodiment.

The distance between the articulated connection of the connecting rod 60 and the wheel axle 12 of the last axle module 11 and the articulated connection 16 is larger than the distance between the articulated connection of the connecting rod 60 and the wheel axle 20 of the bogie frame 19. As a result, the angle between the wheel axle 12 and the second cantilever arm 15 is always larger than the angle between the cantilever arm 15 and the wheel axle 20 of the bogie frame 19, with the result that in the case of steady-state circular travel of the tugger train 100 directional stability of the entire tugger train and, in particular, of the last axle module 11 and of the bogie frame 19 can also be ensured here.

The connecting rod 60 is guided along a side of the second cantilever arm 15, with the result that the connecting rod 60 does not pass over or overlap or cross the second cantilever arm 15.

The invention is therefore not restricted in its embodiment to the preferred exemplary embodiments specified above. Instead, a number of variants which make use of the illustrated solutions even in embodiments of basically different type are conceivable. All of these features and/or advantages, including structural details, spatial arrangements and method steps, which can be found in the claims, the description or the drawings, can be essential to the invention both per se as well as in the extremely wide variety of combinations.

The invention claimed is:

1. A trackless tugger train, comprising:
   at least one transportation module; and
   at least two axle modules;
   wherein the at least one transportation module is arranged between two of the axle modules;
   wherein each axle module has a wheel axle and a steering device for steering the wheel axle;
   wherein each steering device of the respective axle module is embodied in each case in such a way that the steering device steers the respective axle module independently of the steering device of another one of the axle modules;
   wherein the axle modules each have a first cantilever arm and a second cantilever arm, wherein the first cantilever arm and second cantilever arm are connected to the wheel axle via an articulated connection;
   wherein the articulated connection has a first vertical pivoting joint and a second vertical pivoting joint, wherein the first and second vertical pivoting joints each have a rotational axis which is embodied vertically with respect to a longitudinal extent of the cantilever arm, wherein the first cantilever arm is connected to the wheel axle via the first vertical pivoting joint, and wherein the second cantilever arm is connected to the wheel axle via the second vertical pivoting joint; and
   wherein the articulated connection has a horizontal pivoting joint, wherein the horizontal pivoting joint has a rotational axis which extends transversely with respect to the direction of travel of the tugger train at least in the case of straight-ahead travel of the tugger train.

2. A trackless tugger train according to claim 1, characterized in that the steering device is embodied in such a way that the steering device steers the wheel axle into an angle-bisecting position between the first cantilever arm and the second cantilever arm.

3. A trackless tugger train according to either one of claims 1 or 2, characterized in that the steering device is embodied in the form of a spring-damper system.

4. A trackless tugger train according to claim 3, characterized in that the spring-damper system has a first spring element connected to the first cantilever arm and to the wheel axle, a second spring element connected to the second cantilever arm and to the wheel axle, and at least one damper element.

5. A trackless tugger train according to claim 4, characterized in that the at least one damper element is connected to the wheel axle and to the first cantilever arm or to the second cantilever arm.

6. A trackless tugger train according to claim 4, characterized in that the spring-damper system has three damper elements which are each connected by a first end to the wheel axle and by a second end to an attachment frame connected to the articulated connection, wherein a first damper element and a second damper element are arranged inclined at an angle <90° with respect to the longitudinal extent of the wheel axle and are connected to a first side of the wheel axle, and wherein a third damper element is arranged vertically with respect to the longitudinal extent of the wheel axle and is connected to a second side of the wheel axle lying opposite the first side.

7. A trackless tugger train according to either one of claims 1 or 2, characterized in that the steering device has a motor-powered drive which is controlled by means of an electronic control unit.

8. A trackless tugger train, comprising:
   at least one transportation module; and
   at least two axle modules;
   wherein the at least one transportation module is arranged between two of the axles modules;
   wherein each axle module has a wheel axle and a steering device for steering the wheel axle;
   wherein each steering device of the respective axle module is embodied in each case in such a way that the steering device steers the respective axle module independently of the steering device of another one of the modules;
   wherein the axle modules each have a first cantilever arm and a second cantilever arm, wherein the first cantilever arm and the second cantilever arm are connected to the wheel axle via an articulated connection; and
   wherein the steering device has at least two connecting rods, wherein a first connecting rod is connected by a first end to the first cantilever arm and by a second end to the wheel axle, and wherein a second connecting rod is connected by a first end to the second cantilever arm and by a second end to the wheel axle, wherein the connecting rods are each guided in a displaceable fashion in a linear guide by their first end or their second end.

9. A trackless tugger train, comprising:
   at least one transportation module; and
   at least two axle modules;
   wherein the least one transportation module is arranged between two of the axle modules;
   wherein each axle module has a wheel axle and a steering device for steering the wheel axles;
   wherein each steering device of the respective axle module is embodied in each case in such a way that the steering device steers the respective axle module independently of the steering device of another one of the axle modules; and
   wherein the steering device is embodied in the form of a gear until, and wherein the gear unit has a first gear wheel connected to the first cantilever arm, a second gear wheel connected to the second cantilever arm, and at least a third gear wheel connected to the wheel axle, wherein the first gear wheel and the second gear wheel are connected in a rotationally movable fashion by means of the at least one third gear wheel.

10. A trackless tugger train, comprising:
    at least one transportation module; and
    at least two axle modules;
    wherein the at least one transportation module is arranged between two of the axles modules;
    wherein each axle module has a wheel axle and a steering device for steering the wheel axle;
    wherein each steering device of the respective axle module is embodied in each case in such a way that the steering device steers the respective axle module independently of the steering device of another one of the modules;

wherein the axle modules each have a first cantilever arm and a second cantilever arm, wherein the first cantilever arm and the second cantilever arm are connected to the wheel axle via an articulated connection; and wherein a last one of the axle modules when viewed in the direction of travel of the tugger train is connected by the axle module's first cantilever arm to the at least one transportation module and by the axle module's second cantilever arm to a bogie frame having at least one wheel.

11. A trackless tugger train according to claim 10, characterized in that a Bissell bogie is arranged between the last axle module when viewed in the direction of travel of the tugger train and the bogie frame.

12. A trackless tugger train according to claim 11, characterized in that the Bissell bogie has a connecting rod which is connected by a first end to the wheel axle of the last axle module when viewed in the direction of travel, and by a second end, lying opposite the first end, to a wheel axle of the bogie frame.

13. A trackless tugger train according to claim 11, characterized in that the Bissell bogie has a first connecting rod, a second connecting rod and a guide element which is mounted in a displaceably movable fashion on the second cantilever arm of the last axle module when viewed in the direction of travel, wherein the first connecting rod is connected to the guide element and to the wheel axle of the last axle module when viewed in the direction of travel, and wherein the second connecting rod is connected to the guide element and to a wheel axle of the bogie frame.

14. A trackless tugger train, comprising:
at least one transportation module; and
at least two axle modules;
wherein the at least one transportation module is arranged between two of the axles modules;
wherein each axle module has a wheel axle and a steering device for steering the wheel axles;
wherein each steering device of the respective axle module is embodied in each case in such a way that the steering device steers the respective axle module independently of the steering device of another one of the modules; and wherein the at least one transportation module comprises at least two transportation modules which are provided in the form of U-shaped supporting frames, wherein the at least two transportation modules have at their upper ends at least one outwardly directed supporting arm each with a coupling element, wherein the supporting arms, arranged opposite one another, of transportation modules which are arranged adjacent to one another are coupled to one another in an articulated fashion by means of the coupling elements.

15. A trackless tugger train according to claim 14, characterized in that the coupling elements of supporting arms which are arranged opposite one another are connected to a full-floating axle arranged on the articulated connection.

\* \* \* \* \*